United States Patent
McGraw et al.

(10) Patent No.: US 9,523,218 B1
(45) Date of Patent: Dec. 20, 2016

(54) LOCK ASSEMBLY

(71) Applicants: Donnald McGraw, Hudson, CO (US); James McGraw, Denver, CO (US)

(72) Inventors: Donnald McGraw, Hudson, CO (US); James McGraw, Denver, CO (US)

( * ) Notice: Subject to any disclaimer, the term of this patent is extended or adjusted under 35 U.S.C. 154(b) by 0 days.

(21) Appl. No.: 14/745,021

(22) Filed: Jun. 19, 2015

(51) Int. Cl.
| | |
|---|---|
| *B60R 25/10* | (2013.01) |
| *E05B 45/00* | (2006.01) |
| *E05B 39/00* | (2006.01) |
| *E05B 45/06* | (2006.01) |
| *E05B 47/00* | (2006.01) |
| *E05B 67/00* | (2006.01) |
| *E05B 71/00* | (2006.01) |
| *E05B 73/00* | (2006.01) |

(52) U.S. Cl.
CPC ......... *E05B 45/005* (2013.01); *B60R 25/1001* (2013.01); *E05B 39/005* (2013.01); *E05B 45/06* (2013.01); *E05B 47/0001* (2013.01); *E05B 67/006* (2013.01); *E05B 71/00* (2013.01); *E05B 73/0011* (2013.01); *E05B 2047/0067* (2013.01); *E05B 2047/0072* (2013.01); *E05B 2047/0088* (2013.01); *E05B 2047/0095* (2013.01); *E05B 2047/0096* (2013.01)

(58) Field of Classification Search
CPC ....... E05B 45/005; E05B 3/0011; E05B 71/00
USPC .............. 340/426.18, 432; 70/233, 234, 57.1
See application file for complete search history.

(56) References Cited

U.S. PATENT DOCUMENTS

| | | | |
|---|---|---|---|
| 3,824,540 | A | 7/1974 | Smith, II |
| 3,906,758 | A | 9/1975 | Hurwitt |
| 4,776,188 | A | 10/1988 | Dalaba et al. |
| 5,023,596 | A | 6/1991 | Sirman et al. |
| D325,332 | S | 4/1992 | Oberhelman et al. |
| 5,408,212 | A | 4/1995 | Meyers et al. |
| 5,534,847 | A * | 7/1996 | McGregor ............... B62H 5/20 340/427 |
| 7,382,250 | B2 * | 6/2008 | Marcelle ............. E05B 47/0012 340/5.22 |
| 8,854,207 | B2 * | 10/2014 | Williams ............ E05B 73/0011 340/539.13 |
| 9,260,885 | B2 * | 2/2016 | Asquith ................ E05B 45/005 |

* cited by examiner

Primary Examiner — Toan N Pham

(57) ABSTRACT

A lock assembly includes a base unit that may removably restrain a vehicle to a stationary object. The base unit may be in communication with an extrinsic electronic device thereby facilitating the base unit to communicate an alert to the extrinsic electronic device when the vehicle is moved from the stationary object. A remote unit is provided and the remote unit is in communication with the base unit. The remote unit selectively actuates the base unit to communicate the alert to the extrinsic electronic device.

16 Claims, 5 Drawing Sheets

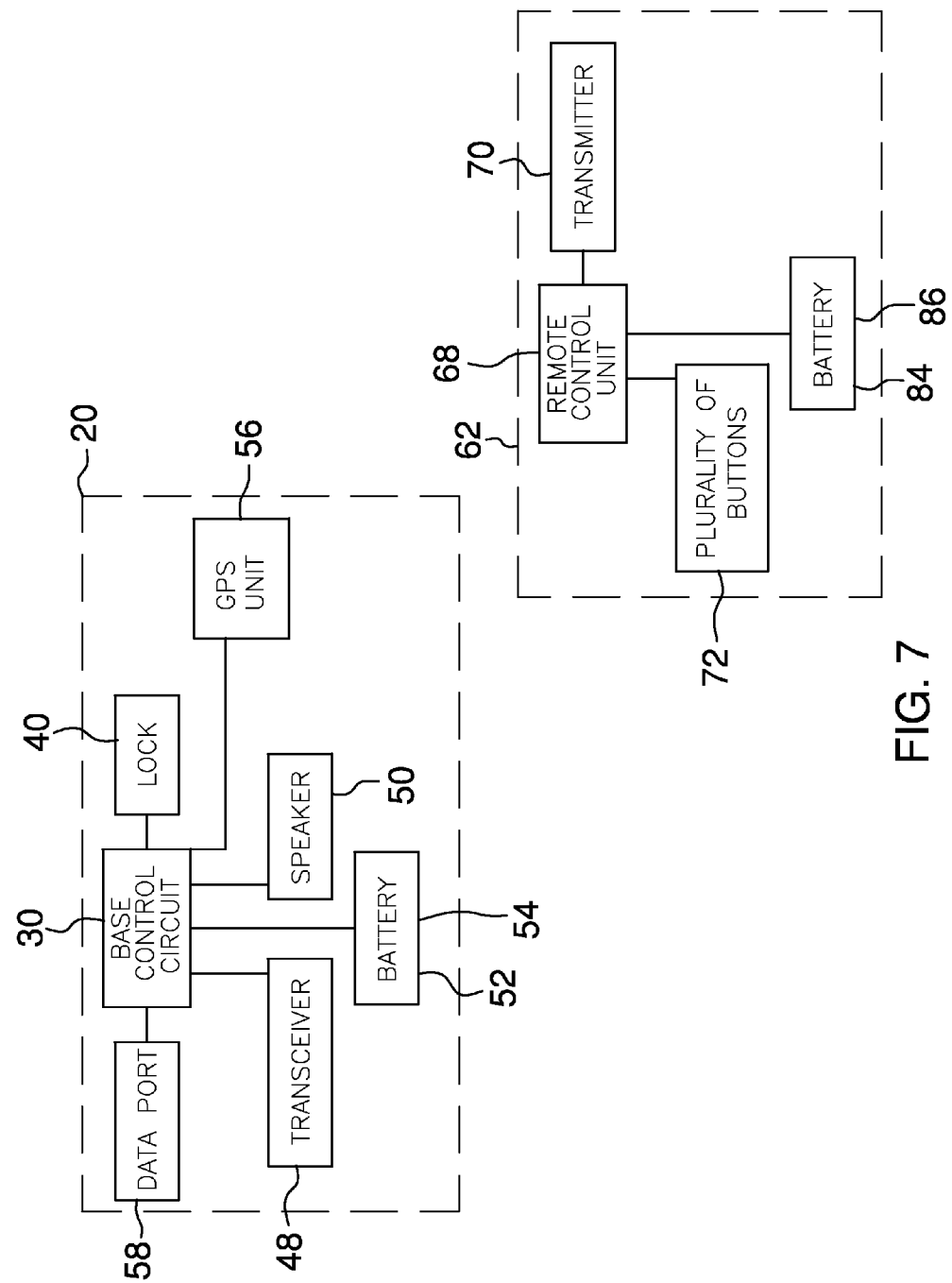

LOCK ASSEMBLY

BACKGROUND OF THE DISCLOSURE

Field of the Disclosure

The disclosure relates to lock devices and more particularly pertains to a new lock device for inhibiting theft of a vehicle.

SUMMARY OF THE DISCLOSURE

An embodiment of the disclosure meets the needs presented above by generally comprising a base unit that may removably restrain a vehicle to a stationary object. The base unit may be in communication with an extrinsic electronic device thereby facilitating the base unit to communicate an alert to the extrinsic electronic device when the vehicle is moved from the stationary object. A remote unit is provided and the remote unit is in communication with the base unit. The remote unit selectively actuates the base unit to communicate the alert to the extrinsic electronic device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 7 is a schematic view of an embodiment of the disclosure.

DESCRIPTION OF THE PREFERRED EMBODIMENT

Figure 1:
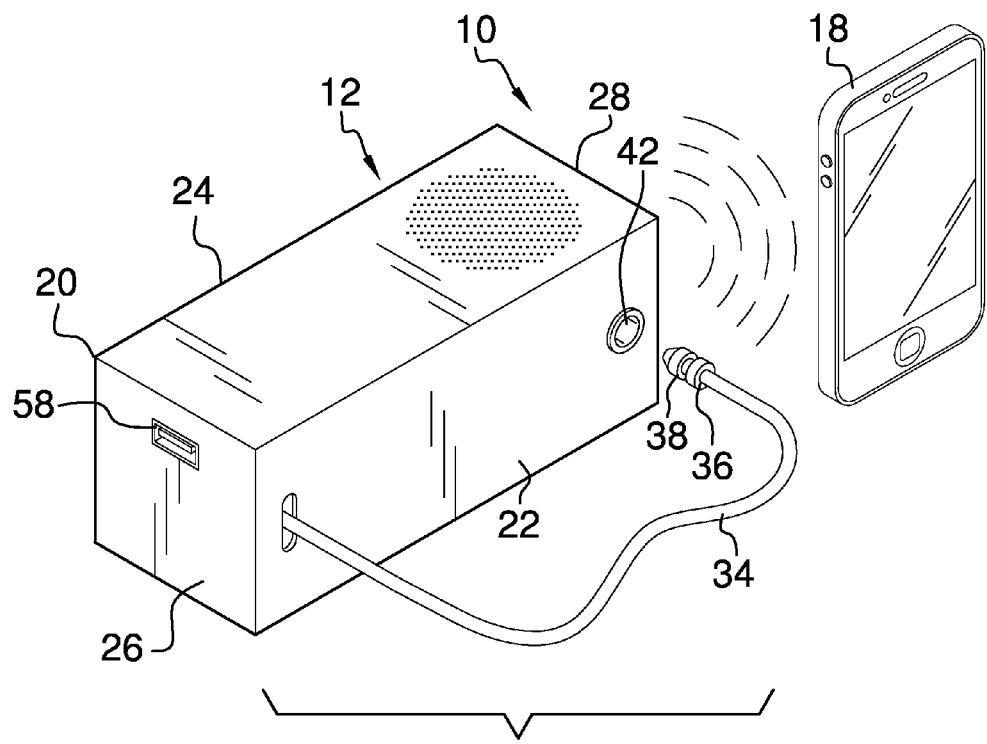
FIG. 1 is a perspective view of a lock assembly according to an embodiment of the disclosure.
Figure 2:
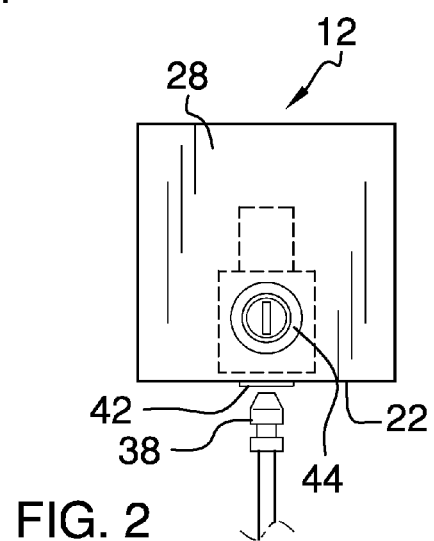
FIG. 2 is a right side view of an embodiment of the disclosure.
Figure 3:
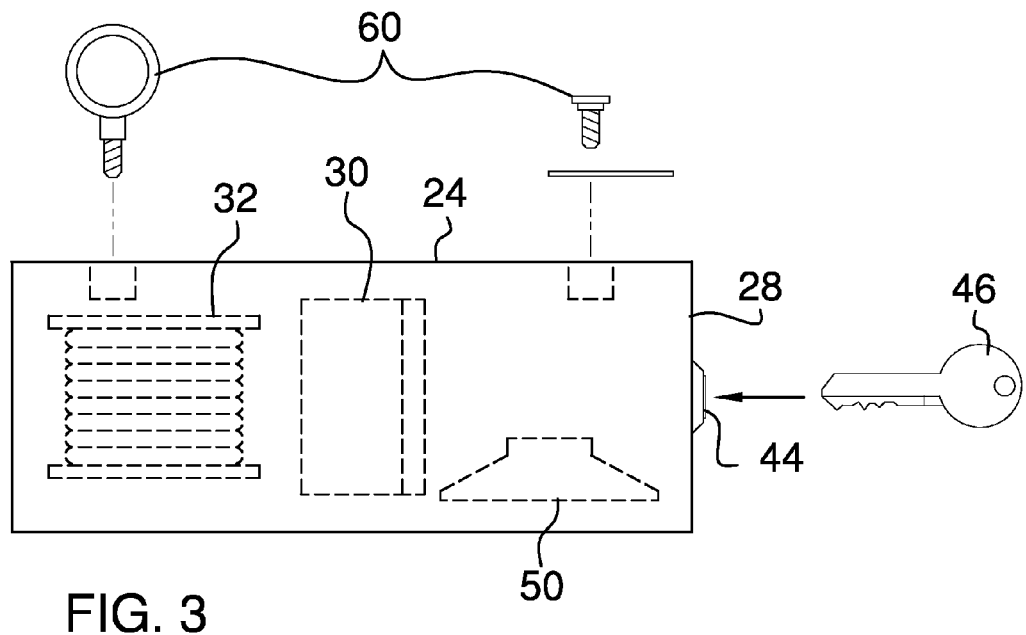
FIG. 3 is a bottom phantom view of an embodiment of the disclosure.
Figure 4:
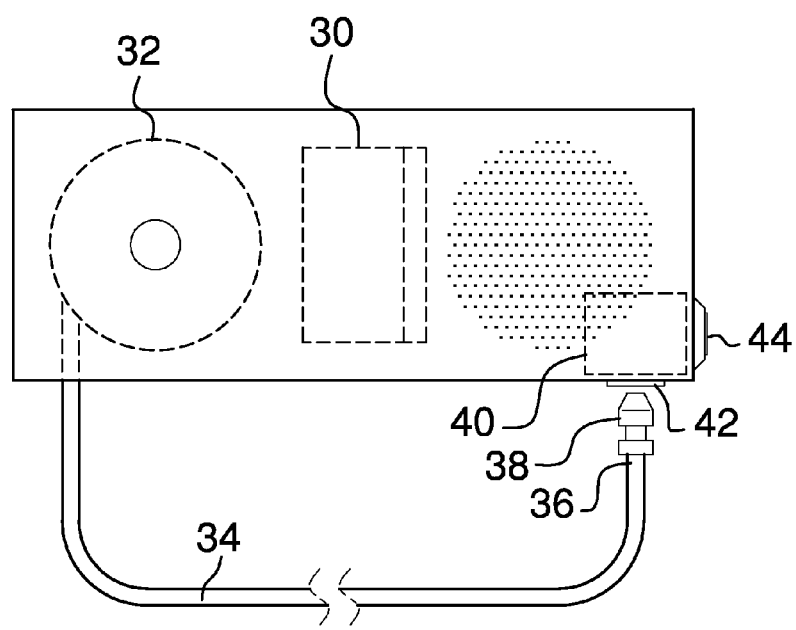
FIG. 4 is a top phantom view of an embodiment of the disclosure.
Figure 5:
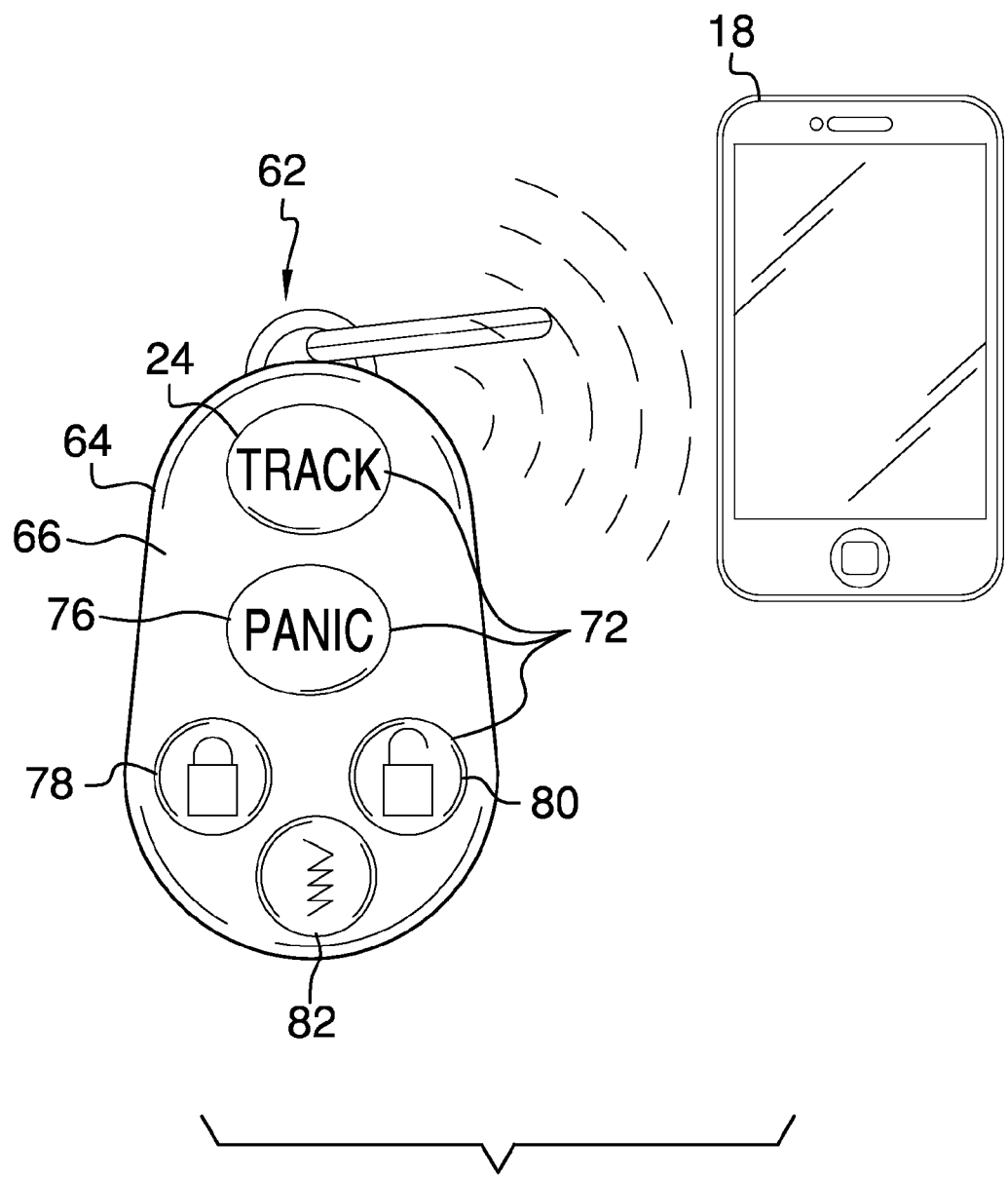
FIG. 5 is a top perspective view of an embodiment of the disclosure.
Figure 6:
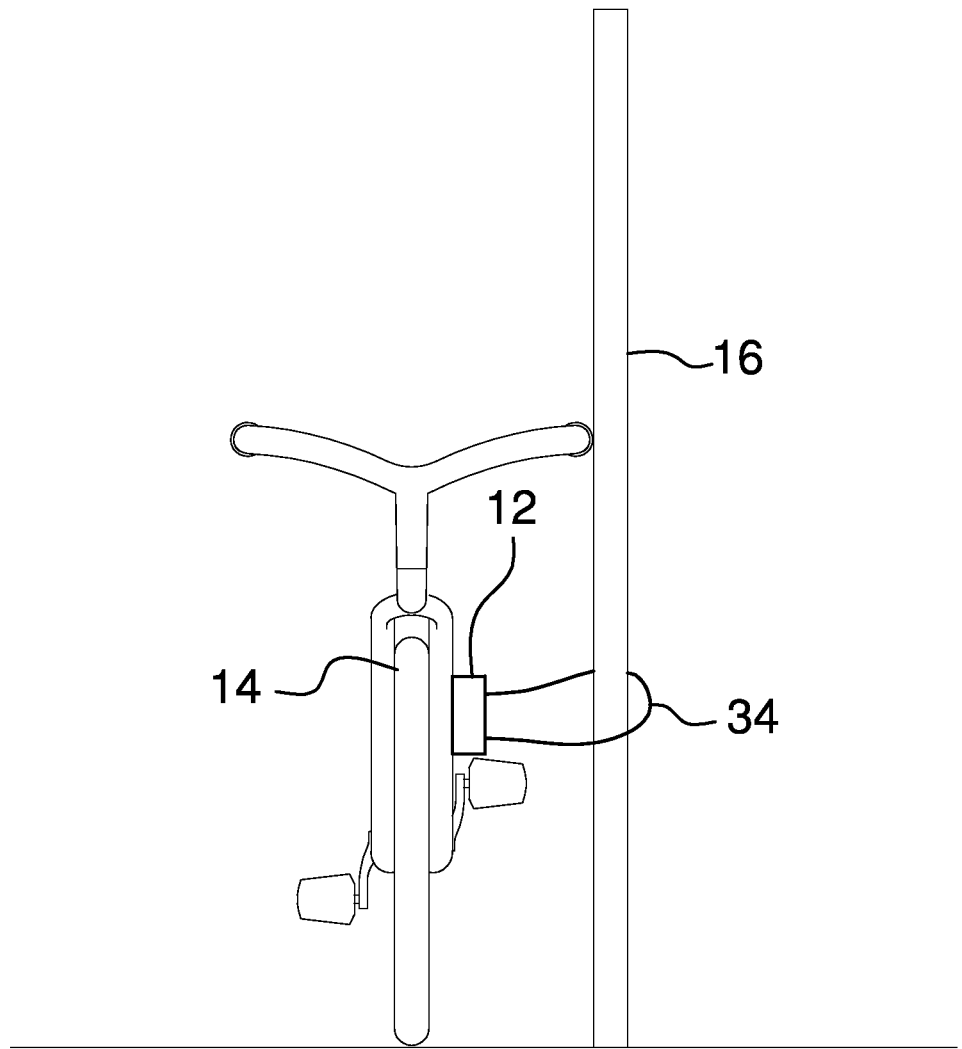
FIG. 6 is a perspective in-use view of an embodiment of the disclosure.

With reference now to the drawings, and in particular to FIGS. 1 through 7 thereof, a new lock device embodying the principles and concepts of an embodiment of the disclosure and generally designated by the reference numeral 10 will be described.

As best illustrated in FIGS. 1 through 7, the lock assembly 10 generally comprises a base unit 12 that may removably restrain a vehicle 14 to a stationary object 16. The vehicle 14 may be a bicycle or the like. The base unit 12 may be in communication with an extrinsic electronic device 18 thereby facilitating the base unit 12 to communicate an alert to the extrinsic electronic device 18 when the vehicle 14 is moved from the stationary object 16. The extrinsic electronic device 18 may comprise a smart phone or the like.

The base unit 12 comprises a housing 20 that has a front wall 22, a back wall 24, a first lateral wall 26 and a second lateral wall 28. A base control circuit 30 is positioned within the housing 20 and the base control circuit 30 is selectively actuatable to generate a first alarm sequence and a second alarm sequence. The base control circuit 30 may comprise an electronic processor or the like.

A spool 32 is rotatably positioned within the housing 20. The spool 32 is biased to rotate in a retracting direction and the spool 32 is urgeable to rotate in an extending direction. A cable 34 is coupled to the spool 32 such the cable 34 is wrapped around the spool 32 when the spool 32 is biased into the retracting direction. The cable 34 extends outwardly from the front wall 22 of the housing 20. The cable 34 has a distal end 36 with respect to the spool 32 and the distal end 36 has a plug 38 coupled thereto. The cable 34 is selectively urged outwardly from the housing 20 to rotate the spool 32 in the extending direction. Thus, the cable 34 may be wrapped around the vehicle 14 and the stationary object 16.

A lock 40 is positioned within the housing 20 and the lock 40 is electrically coupled to the base control circuit 30. The lock 40 includes a port 42 extending through the front wall 22 and a key switch 44 extending through the second lateral wall 28. The port 42 may be positioned adjacent to the second lateral wall 28. The port 42 insertably receives the plug 38 when the cable 34 is wrapped around the vehicle 14 and the stationary object 16 such that the lock 40 retains the vehicle 14 on the stationary object 16. The key switch 44 may insertably receive a key 46 such that the key switch 44 is manipulated to release the plug 38 from the port 42. The base control circuit 30 generates the first alarm sequence when the plug 38 is forcibly removed from the port 42.

A transceiver 48 is positioned within the housing 20 and the transceiver 48 is electrically coupled to the base control circuit 30. The transceiver 48 is in electrical communication with the extrinsic electronic device 18 such that the external electronic device 18 issues the alert when the base control circuit 30 generates the first alarm sequence and the second alarm sequence. The transceiver 48 may comprise a radio frequency transceiver or the like.

A speaker 50 is positioned within the housing 20 and the speaker 50 is electrically coupled to the base control circuit 30. The speaker 50 emits an audible alarm when the base control circuit 30 generates the first alarm sequence. A base power supply 52 is positioned within the housing 20 and the base power supply 52 is electrically coupled to the base control circuit 30. The base power supply 52 comprises at least one battery 54.

A gps unit 56 is positioned within the housing 20 and the gps unit 56 is electrically coupled to the base control circuit 20. The gps unit 56 monitors a location of the vehicle 14 with respect to Earth. The base control circuit 20 generates the second alarm sequence when the gps unit 56 detects motion of the vehicle 14 when the port 42 insertably receives the plug 38.

A data port 58 is attached to the housing 20 and the data port 58 may be positioned on the first lateral wall 26. The data port 58 is electrically coupled to the base control circuit 20. The data port 58 may be electrically coupled to the extrinsic electronic device 18. The data port 58 may comprise a USB port or the like.

A pair of fasteners 60 is provided and each of the fasteners 60 may removably engage the back wall 24 of the housing 20. Each of the fasteners 60 may engage the vehicle 14 such that the housing 20 is retained on the vehicle 14. The fasteners 60 may comprise an eye loop and a bolt or the like.

A remote unit 62 is provided that may be carried. The remote unit 62 is in communication with the base unit 12 and the remote unit 62 selectively actuates the base unit 12 to communicate the alert to the extrinsic electronic device 18. The remote unit 62 comprises a key fob 64 that has a front wall 66. A remote control circuit 68 is positioned within the key fob 64. The remote control circuit 68 may comprise an electronic processor or the like.

A transmitter 70 is positioned within the key fob 64 and the transmitter 70 is electrically coupled to the remote control circuit 68. The transmitter 70 is in electrical communication with the transceiver 48. The transmitter 70 may comprise a radio frequency transmitter or the like.

A plurality of buttons 72 is positioned on the front wall 66 of the key fob 64 such that the buttons 72 may be manipulated. Each of the buttons 72 is electrically coupled to the remote control circuit 68. The plurality of buttons 72 may include a track button 74, a panic button 76, a lock button 78, an unlock button 80, and a motion sensor button 82. The lock button 78 actuates the base control circuit 30 to generate the first alarm sequence and the motion sensor button 82 actuates the base control circuit 30 to generate second alarm sequence. The unlock button 80 actuates the port 42 to release the plug 38 and the panic button 76 actuates the base control circuit 30 to generate the first alarm sequence. The track button 74 actuates the extrinsic electronic device 18 to display the location of the vehicle 14 as determined by the gps unit 56.

A remote power supply 84 is positioned within the key fob 64 and the remote power supply 84 is electrically coupled to the remote control circuit 68. The remote power supply 84 comprises at least one battery 86.

In use, the cable 34 is urged outwardly from the spool 32 and the cable 34 is wrapped around the vehicle 14 and the stationary object 16. The plug 38 is inserted into the port 42 and the lock button 78 is manipulated on the key fob 64 to actuate the first alarm sequence. The extrinsic electronic device 18 issues the alert if the plug 38 is forcibly removed from the port 42. The unlock button 80 is manipulated to remove the plug 38 from the port 42. Additionally, the key 46 may be inserted into the key switch 44 the remove the plug 38 from the port 42. Each of the unlock button 80 and the key switch 44 de-actuate the first alarm sequence. The motion sensor button 82 is manipulated to actuate the second alarm sequence. The base control circuit 30 may not be actuated to simultaneously generate the first alarm sequence and the second alarm sequence.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A lock assembly configured to inhibit theft of a vehicle, said assembly comprising:
    a base unit configured to removably restrain a vehicle to a stationary object, said base unit being configured to be in communication with an extrinsic electronic device thereby facilitating said base unit to communicate an alert to the extrinsic electronic device when the vehicle is moved from the stationary object; and
    a remote unit configured to be carried, said remote unit being in communication with said base unit, said remote unit selectively actuating said base unit to communicate said alert to the extrinsic electronic device.

2. The assembly according to claim 1, wherein said base unit comprises a housing having a front wall, a first lateral wall and a second lateral wall.

3. The assembly according to claim 2, further comprising a base control circuit being positioned within said housing, said base control circuit being selectively actuatable to generate a first alarm sequence and a second alarm sequence.

4. The assembly according to claim 3, further comprising a transceiver being positioned within said housing, said transceiver being electrically coupled to said base control circuit, said transceiver being configured to be in electrical communication with the extrinsic electronic device wherein the external electronic device issues the alert when said control circuit generates said first alarm sequence and said second alarm sequence.

5. The assembly according to claim 3, further comprising a speaker being positioned within said housing, said speaker being electrically coupled to said base control circuit, said speaker emitting an audible alarm when said control circuit generates said first alarm sequence.

6. The assembly according to claim 3, further comprising:
    a plug;
    a port insertably receiving said plug; and
    a gps unit being positioned within said housing, said gps unit being electrically coupled to said base control circuit, said gps unit being configured to monitor a location of the vehicle, said control circuit generating said second alarm sequence when said gps unit detects motion of the vehicle when said port insertably receives said plug.

7. The assembly according to claim 3, wherein a base power supply being positioned within said housing, said base power supply being electrically coupled to said base control circuit, said base power supply comprising at least one battery.

8. The assembly according to claim 1, further comprising a spool being rotatably positioned within said housing, said spool being biased to rotate in a retracting direction, said spool being urgeable to rotate in extending direction.

9. The assembly according to claim 8, wherein a cable being coupled to said spool wherein said cable is wrapped around said spool when said spool is biased into said retracting direction, said cable extending outwardly through said front wall, said cable having a distal end with respect to said spool, said distal end having a plug being coupled thereto, said cable being selectively urged to rotate said spool in said extending direction wherein said cable is configured to be wrapped around the vehicle and the stationary object.

10. The assembly according to claim 1, further comprising:
   a base control circuit, said base control circuit selectively generating a first alarm sequence;
   a housing having a front wall and a second lateral wall; and
   a lock being positioned within said housing, said lock being electrically coupled to said base control circuit, said lock including a port extending through said front wall and a key switch extending through said second lateral wall, said port being positioned adjacent to said second lateral wall.

11. The assembly according to claim 10, further comprising:
   a port; and
   said port insertably receiving said plug when said cable is wrapped around the vehicle and the stationary object wherein said lock is configured to retain the vehicle on the stationary object, said key switch being configured to insertably receive a key wherein said key switch is manipulated to release said plug from said port, said control circuit generating said first alarm sequence when said plug is forcibly removed from said port.

12. The assembly according to claim 1, wherein said remote unit comprises:
   a key fob having a front wall; and
   a remote control circuit being positioned within said key fob.

13. The assembly according to claim 12, further comprising:
   a transceiver; and
   a transmitter being positioned within said key fob, said transmitter being electrically coupled to said remote control circuit, said transmitter being in electrical communication with said transceiver.

14. The assembly according to claim 12, further comprising:
   a base control circuit, said base control circuit being actautable to generate a first alarm sequence and a second alarm sequence; and
   a plurality of buttons being positioned on said front wall of said key fob wherein said buttons are configured to be manipulated, each of said buttons being electrically coupled to said remote control circuit, one of said buttons actuating said base control circuit to generate said first alarm sequence, one of said buttons actuating said base control circuit into said second alarm sequence.

15. The assembly according to claim 12, wherein a remote power supply being positioned within said key fob, said remote power supply being electrically coupled to said remote control circuit, said remote power supply comprising at least one battery.

16. A lock assembly configured to inhibit theft of a vehicle, said assembly comprising:
   a base unit configured to removably restrain a vehicle to a stationary object, said base unit being configured to be in communication with an extrinsic electronic device thereby facilitating said base unit to communicate an alert to the extrinsic electronic device when the vehicle is moved from the stationary object, said base unit comprising:
      a housing having a front wall, a first lateral wall and a second lateral wall,
      a base control circuit being positioned within said housing, said base control circuit being selectively actuatable to generate a first alarm sequence and a second alarm sequence,
      a spool being rotatably positioned within said housing, said spool being biased to rotated in a retracting direction, said spool being urgeable to rotate in extending direction,
   a cable being coupled to said spool wherein said cable is wrapped around said spool when said spool is biased into said retracting direction, said cable extending outwardly through said front wall, said cable having a distal end with respect to said spool, said distal end having a plug being coupled thereto, said cable being selectively urged to rotate said spool in said extending direction wherein said cable is configured to be wrapped around the vehicle and the stationary object,
      a lock being positioned within said housing, said lock being electrically coupled to said base control circuit, said lock including a port extending through said front wall and a key switch extending through said second lateral wall, said port being positioned adjacent to said second lateral wall, said port insertably receiving said plug when said cable is wrapped around the vehicle and the stationary object wherein said lock is configured to retain the vehicle on the stationary object, said key switch being configured to insertably receive a key wherein said key switch is manipulated to release said plug from said port, said control circuit generating said first alarm sequence when said plug is forcibly removed from said port,
      a transceiver being positioned within said housing, said transceiver being electrically coupled to said base control circuit, said transceiver being configured to be in electrical communication with the extrinsic electronic device wherein the external electronic device issues the alert when said control circuit generates said first alarm sequence and said second alarm sequence,
      a speaker being positioned within said housing, said speaker being electrically coupled to said base control circuit, said speaker emitting an audible alarm when said control circuit generates said first alarm sequence,
      a gps unit being positioned within said housing, said gps unit being electrically coupled to said base control circuit, said gps unit being configured to monitor a location of the vehicle, said control circuit generating said second alarm sequence when said gps unit detects motion of the vehicle when said port insertably receives said plug, and
      a base power supply being positioned within said housing, said base power supply being electrically coupled to said base control circuit, said base power supply comprising at least one battery;
   a remote unit configured to be carried, said remote unit being in communication with said base unit, said remote unit selectively actuating said base unit to communicate said alert to the extrinsic electronic device, said remote unit comprising:
      a key fob having a front wall,
      a remote control circuit being positioned within said key fob,
      a transmitter being positioned within said key fob, said transmitter being electrically coupled to said remote control circuit, said transmitter being in electrical communication with said transceiver, a plurality of buttons being positioned on said front wall of said key fob wherein said buttons are configured to be manipulated, each of said buttons being electrically coupled to said remote control circuit, one of said buttons actuating said base control circuit to generate said first alarm sequence, one of said buttons actuating said base control circuit into said second alarm sequence, and a remote power supply being positioned within said key fob, said remote power supply being electrically coupled to said remote control circuit, said remote power supply comprising at least one battery.

* * * * *